(12) United States Patent
Nitzsche

(10) Patent No.: US 6,916,770 B2
(45) Date of Patent: Jul. 12, 2005

(54) MULTI-FUNCTIONAL COLOR CONCENTRATE COMPOSITIONS

(75) Inventor: Norman E. Nitzsche, Willard, OH (US)

(73) Assignee: Polyone Corporation, Avon Lake, OH (US)

( * ) Notice: Subject to any disclaimer, the term of this patent is extended or adjusted under 35 U.S.C. 154(b) by 186 days.

(21) Appl. No.: 10/150,305

(22) Filed: May 17, 2002

(65) Prior Publication Data

US 2002/0198122 A1 Dec. 26, 2002

Related U.S. Application Data

(63) Continuation-in-part of application No. 10/126,312, filed on Apr. 19, 2002, now abandoned, which is a continuation-in-part of application No. 09/844,459, filed on Apr. 27, 2001, now Pat. No. 6,384,002.

(51) Int. Cl.$^7$ .............................. C11D 3/14; C11D 3/02
(52) U.S. Cl. ...................... 510/188; 510/208; 510/396; 510/445; 510/478; 510/488; 510/499; 510/500; 264/39
(58) Field of Search ................................. 510/188, 208, 510/396, 445, 478, 488, 499, 500; 264/39

(56) References Cited

U.S. PATENT DOCUMENTS

| | | | |
|---|---|---|---|
| 2,952,888 A | | 9/1960 | Cornelius |
| 3,764,362 A | | 10/1973 | Hinley et al. |
| 3,778,288 A | | 12/1973 | Ridge et al. |
| 3,844,810 A | | 10/1974 | Pollard |
| 3,869,525 A | | 3/1975 | Miller |
| 4,080,134 A | | 3/1978 | Klaeysen et al. |
| 4,092,285 A | | 5/1978 | Leo et al. |
| 4,275,100 A | | 6/1981 | Datta |
| 4,446,086 A | | 5/1984 | Molenaar et al. |
| 4,789,321 A | | 12/1988 | Dingus |
| 4,834,902 A | | 5/1989 | Pioch et al. |
| 4,838,945 A | | 6/1989 | Fujii et al. |
| 5,076,339 A | | 12/1991 | Smith |
| 5,139,694 A | | 8/1992 | Kmiec |
| 5,176,751 A | * | 1/1993 | Findley ...................... 106/502 |
| 5,236,514 A | | 8/1993 | Leung et al. |
| 5,256,185 A | | 10/1993 | Semel et al. |
| 5,395,456 A | * | 3/1995 | Abrams et al. .......... 134/22.14 |
| 5,424,012 A | | 6/1995 | Ertle et al. |
| 5,443,768 A | * | 8/1995 | Scheibelhoffer et al. ...... 264/39 |
| 6,060,445 A | | 5/2000 | Chandraker et al. |
| 6,384,002 B1 | | 5/2002 | Nitzsche |
| 6,617,295 B2 | * | 9/2003 | Nitzsche ...................... 510/188 |
| 2002/0193267 A1 | * | 12/2002 | Nitzsche ...................... 510/188 |
| 2002/0198121 A1 | * | 12/2002 | Nitzsche ...................... 510/188 |
| 2002/0198122 A1 | * | 12/2002 | Nitzsche ...................... 510/188 |
| 2002/0198123 A1 | * | 12/2002 | Nitzsche ...................... 510/188 |

FOREIGN PATENT DOCUMENTS

| | | | |
|---|---|---|---|
| EP | 370424 | * | 5/1990 |
| GB | 2087787 | | 6/1982 |
| JP | 61215248 | | 9/1986 |

OTHER PUBLICATIONS

U.S. Appl. No. 10/126,312, Nitzsche, filed Apr. 19, 2002.
U.S. Appl. No. 10/150,166, Nitzsche, filed May 17, 2002.
U.S. Appl. No. 10/171,055, Nitzsche, filed Jun. 13, 2002.
*The Production of A–C Polyethylene Color Concentrates*, Technical Data Brochure for Plastics, No. PLS–002, from Allied Corp., Morristown, NJ (undated) 3 pages, no date given.
*Series CL Laboratory Pellet Mills*, from California Pellet Mill Company, 1987, 4 pages, no month given.
*Mineral Fillers in the Plastics Industry–A Review*, Technical Note No. 184, from Polymers & Plastics dated Aug. 26, 1999, pp. 1–13.
Fillers and Reinforcing Agents in Plastics–Physical Chemical Aspects for the Processor, Technical Note No. 172, from Polymers & Plastics dated Aug. 26, 1999, pp. 1–13.
Modern Plastics Encyclopedia, Mid–Oct. 1989 Issue, vol. 66, No. 11, McGraw–Hill, Inc., 1989, pp. 648–660 no month given.

* cited by examiner

Primary Examiner—Brian P. Mruk
(74) Attorney, Agent, or Firm—John H. Hornickel

(57) ABSTRACT

A multi-functional concentrate composition which can be utilized to impart a desired color to a polymeric material and improve the processability thereof. The composition comprises at least one pigment, a blowing or foaming agent, and a binder component which at least allows the polymeric material to be processed at lower pressures than would otherwise be necessary for the same composition without the blowing agent.

24 Claims, No Drawings

MULTI-FUNCTIONAL COLOR CONCENTRATE COMPOSITIONS

CROSS REFERENCE

This application is a continuation-in-part of prior application Ser. No. 10/126,312, filed Apr. 19, 2002, now abandoned which is a continuation-in-part of prior application Ser. No. 09/844,459, filed Apr. 27, 2001, now U.S. Pat. No. 6,384,002 and both entitled "A Composition and Method for Purging Polymer Processing Equipment."

FIELD OF THE INVENTION

The present invention relates to a particulate composition, preferably a concentrate composition, which advantageously includes pigments, a functional additive such as blowing agents, and a binder that is preferably a wax that can be added to a polymeric material prior to processing into an article. The pigments add a desired color to a material while the blowing agent enhances processability of the same. The compositions are universal in nature as they are free of any thermoplastic polymeric resin material which advantageously renders them compatible with a number of different polymeric materials.

BACKGROUND OF THE INVENTION

Concentrates or "master batches" of additive concentrates, color concentrates or the like and methods for preparing the same for addition to and dispersion in plastics, polymers, resins, etc. are known. Color concentrates generally consist of high concentrations of pigment dispersed in, and bound by a binder resin of a type similar to the medium to be pigmented. Color concentrates overcome the problem typically associated with free or natural state pigment such as dustiness and their tendency to become airborne and contaminate their surroundings.

Color concentrates predominantly contain pigments at a much higher concentration than is required in a final colored product. They are usually available in pellets, chips or non-dusting powders which are dry blended before processing with virgin or recycled polymeric resin in the correct proportions to achieve a preferred depth of color in the final product. The binder is conventionally selected to correspond substantially identically with the material being colored, e.g. powdered polyethylene binder for concentrates added to polyethylene. Thus if many different base resins are utilized, numerous different concentrates with different binders must be kept on hand. It would therefore be desirable to provide a color concentrate with a binder system which is compatible with a large number of resins or polymeric materials.

Furthermore, color concentrates and resins are typically processed in typical polymer processing machinery under high pressures which can cause physical imperfections in the final molded products. It would therefore be desirable to provide a composition which could reduce these physical imperfections.

SUMMARY OF THE INVENTION

The present invention relates to a multi-functional concentrate composition which can be utilized to both color a polymeric material and improve the processability thereof in typically utilized polymer processing devices. The composition comprises a substantial amount of at least one pigment, a blowing or foaming agent, and a binder component.

When the compositions of the present invention are blended at a desired ratio with a polymeric material, numerous advantages are realized as the single composition performs multiple functions. The blowing agent allows the polymeric material to be processed at lower pressures than what would otherwise be necessary for the same composition without the blowing agent. Furthermore, cycle times can be reduced, resulting in greater throughput of finished products. Finished part quality can be improved, and beneficial weight reduction can be achieved.

DETAILED DESCRIPTION OF THE INVENTION

A) Color Concentrate Compositions

The concentrate compositions of the present invention are useful to color or tint polymeric materials as well as improve the processability thereof.

In order to color or tint a polymeric material, the compositions of the present invention contain pigments. Pigment can generally be defined as any colorant or substance that imparts color to another substance or mixture. When utilized within the application, the term pigment encompasses dyes, both natural and synthetic. Pigments can be inorganic and include metallic oxides, metal powder suspensions, earth colors, lead chromates, and carbon blacks; or organic including those derived from animal sources, vegetable sources, or synthetic processes. The pigment should be in particle form and should have a mean particle size between about 0.1 and about 100 microns and preferably between about 0.2 and about 50 microns. The most preferred mean particle size for organic pigments is about 0.2 microns. The most preferred particle size for inorganic pigments is about 50 microns. Generally the larger the particle size, the easier the pigment is to disperse.

Examples of organic and inorganic pigments which can be used in this invention include, but are not limited to, iron blue zinc oxide, titanium dioxide, chrome yellow, carbon black, chrome orange, chrome green, zinc chromate, red lead, lethol red, azo type toners, phthalocyanines, aluminum hydrates, lakes, iron oxide, white lead, extenders, phosphotungstic acid toners, titanium-containing pigments such as nickel titanate and antimony titanate, cobalt, sulfur-containing pigments, aluminum oxide, lithopane, ultraphone, lead chromate, cadmium sulfide, cadmium selenide, barium sulfate, azo pigments, anthraquinone and vat pigments, phthalocyanine pigments, acrylamino yellow, magnesium oxide, chrome red, antimony oxide, zinc sulfide, magnesium fluoride and ground barytes. Benzoid pigments are useful and examples are toners and lakes. Examples of benzoid toners are yellow toners, e.g., benzoid yellows and Hansa yellows; organe toners, e.g., vat orange 3; red toners, e.g., napthol reds; violet toners; blue toners; green toners; brown toners; and black toners. Examples of benzoid lakes are yellow lakes, e.g., acid yellow 2; orange lakes; red lakes; violet lakes; blue lakes; e.g., acid blue 93; green lakes; brown lakes; and black lakes, e.g., natural black 3. Metallic pigments can be used, and examples are aluminum flakes. Mica-coated afflairs can also be utilized. Further colorants include pearlescent, phosphorescent, and fluorescent pigments. Typical organic and inorganic pigments are listed in *Modern Plastics Encyclopedia*, Mid-October 1989 Issue, Vol. 66, No. 11, McGraw-Hill, Inc., 1989, at pages 648–660, and the *Kirk-Othmer Concise Encyclopedia of Chemical Technology*, John Wiley & Sons, Inc. 1985, at pages 303–304 and 887–892, the contents of both of which are hereby incorporated by reference. Mixtures of pigments can be used.

Pigments are utilized in the color concentrate compositions of the present invention in a range generally from about 1 part to about 75 parts, and preferably from about 35 parts to about 70 parts by weight based on 100 parts by weight of the color concentrate composition. It is to be understood that small amounts of pigment, i.e. from about 1 to about 30 parts per 100 parts by weight of the composition are generally utilized when only tinting or a lesser amount of color effect is desired in a final product (concentrate and polymer). Typically, more inorganic pigment must be utilized to provide a desired effect than organic pigment. Accordingly, when a color concentrate composition only contains inorganic pigments, the same are utilized in amounts from about 1 to about 75 parts per 100 parts of composition. When organic pigment is solely utilized as a colorant, the composition generally contains from about 35 to about 50 parts of pigment per 100 parts of the total composition. When blends of both organic and inorganic pigments are utilized, the pigment generally ranges from about 50 to about 75 parts per 100 parts by weight of the color concentrate composition. These ranges are not meant to be limitations, but only general guidelines as the requirements for different products undoubtedly will have different pigment loading requirements. The remainder of the color concentrate composition includes blowing agents, a binder, and optional ingredients.

Blowing or foaming agents are also utilized in the composition of the present invention. Blowing agents can be endothermic, exothermic, or a combination thereof. The specific blowing agent utilized is selected to be active at or below the processing temperature or range of the polymeric material being processed. Typical blowing agents, when activated, evolve or produce a gas such as nitrogen or carbon dioxide. As the gas evolves, the volume of the composition-polymeric material mixture expands within the processing device. In order to prevent the blowing agent from prematurely activating or decomposing, the concentrate compositions are processed and preferably formed into particles below the activation temperature of the blowing agent. The particles are a conglomerate of the components of the present invention in a solid, non-liquid form such as but not limited to pellets, granules and flakes, with pellets being preferred.

During molding of a polymeric material and a concentrate at elevated temperatures sufficient to degrade or activate the blowing agent, endothermic blowing agents will absorb heat as they degrade, which can reduce the cure time (mold closed) during a molding operation. The melt flow (polymer and concentrate) is placed under greater pressure by the blowing agent due to the evolution of gas. Accordingly, the injection pressures, as well as injection fill times can be reduced which results in both time and energy savings. The creation of a micro cell structure will eliminate such molding flaws as sinks. Cell structure is dictated by at least the volume of gas present in the melt flow (ml/gm) and the particle size of the nucleator. Eliminating or reducing the pack and hold portion of the injection cycle can also control over-packing. Also, a short shot of a reduced amount of polymeric material and concentrate can be utilized to fill the cavity due to the cell expansion of the blowing agent. The compositions of the present invention will allow one to fill tool, which are oversized, for barrel capacity by increasing the overall volume.

Suitable commercially available blowing agents available from Mats Corp. Ltd. of Markham, Ontario as MS01, Cenblo Mat 100 or 500 (a carboxylic acid and carbonate based product), Uniroyal Chemical Company, Inc. of Middlebury, Conn., as Expandex® 5PT (a 5-phenyl tetrazole based product), EPI Environmental Plastics Inc. of Conroe, Tex., as EPIcor, Uniroyal Chemical Company of Middlebury, Conn., as Expandex and Reedy International Corp. of Keyport, N.J. as Safoam.

Non-limiting examples of endothermic blowing agents are polycarbonic acids, coating sodium bicarbonate, coated citric acid, coated mono sodium citrate, and coated sodium citrate. Exothermic blowing agents include azodicarbonamides, modified azodicarbonamides, oxybis benzene sulfony hydrazide (OBSH), toluenesulfonyhydrazides (TSH), 5-pheyltetrazole (5-PT), diisopropylhydrazodicarboxylate (DIHC), and dinitrosopentamethylenetetramine (DNPT).

Blowing agents in general are utilized in the color concentrate compositions of the present invention in amounts ranging from 1 to about 75 parts per 100 total parts by weight of the composition, with 15 to 30 parts being preferred. Endothermic blowing agents are utilized in the color concentrate compositions of the present invention in amounts which range generally from about 1 part to about 75 parts, desirably from about 25 parts to about 50 parts, and exothermic blowing agents are utilized in amounts generally from about 1 part to about 60 parts, and desirably from about 10 parts to about 30 parts by weight based on 100 parts by weight of the composition. The blowing agent is utilized in amounts sufficient to reduce the molding cycle time of a thermoplastic composition when compared to the same composition without the blowing agent.

A binder component is utilized in the compositions of the present invention. The binder can beneficially "wet" the pigments present and render them more dispersible in the polymeric material to be colored. The binder components are waxes which can be natural or synthetic. The waxes are generally solid at room temperature and have a molecular weight of less than about 10,000 weight average. The binder component is present in the color concentrate compositions of the invention in amounts greater than about 10%, generally from about 10 to about 40 or 50%, and preferably from about 15 to about 30%.

Examples of waxes suitable for the binder component of the present invention include, but are not limited to, amide waxes such as ethylene bis-stearamide wax and hydroxystearamide wax, maleated ethylene waxes, maleated propylene waxes, microcrystalline waxes, oxidized waxes, paraffin waxes, petroleum waxes, polyethylene waxes, PTFE waxes, ethylene vinyl acetate waxes, wax esters, wax soaps, and polycaprolactone wax, or combinations thereof. The preferred binder component is a mixture of ethylene bis-stearamide wax and hydroxystearamide wax, at a ratio of about 60% to about 40%, respectively based on the total binder component. A further preferred binder component is a mixture of polycaprolactone wax and polyolefin wax, preferably in equal amounts, or a mixture of ethylene bis-stearamide wax, hydroxystearamide wax, polycaprolactone wax, and polyolefin wax.

The multi-functional concentrate composition of the present invention can optionally include at least one functional compounding additive component including, but not limited to, nucleators, activators which lower the activation temperature of the blowing agent, surfactants, plasticizers, stabilizers, flame retardants, UV absorbers, fillers, fragrances, mold release aids, processing aids, biocides, and antistatic additives, anti-microbial agents and lubricants. The optional components including one or any combination of the above listed components are present in the color concentrate compositions in an amount generally from about 0 or 1 part to about 98 parts, desirably from about 25 parts to about 50 parts, and preferably from about 10 parts to about 20 parts by weight based on 100 parts of the total composition.

Examples of commonly utilized functional compounding additives or components include alkylated phenols-and bisphenols, alkylidene bis, tris, and polyphenols, thio and di-thiobis, tris and polyalkylated phenols, phenol condensation products, amines, esters, organic phosphites and phosphates, glycerol esters, glyceride, organic phosphate ester, mineral oil, quaternary ammonium compounds, anionics, alkane sulfonate, spheriglas, antimony mercaptide, berium cadmium liquids and powders, barium cadmium zinc liquids and powders, barium calcium zinc powders and liquids, barium organic, barium powder, barium zinc liquids and powders, cadmium liquids, cadmium zinc liquids, calcium powders, calcium tin zinc pastes, liquids, and powders, calcium zinc pastes, liquids, and powders, epoxies, hydroxyl amines, leads, mixed metal soaps, phenols, phosphites, single metal soaps, tins, zinc and zinc complex, catalysts, alcohol esters, complex esters, combination blends, costabilizing lubricants, fatty acids, fatty acid amides, fatty acid esters, fatty alcohols, glycol esters, metallic stearates, aluminum, barium, lithium, magnesium, sodium, stannous tin, polypropylene amorphous, and crystalline, silicones, abietic derivatives, acetic acid derivative, azelatic acid derivatives, benzoic acid derivatives, butene derivative, organic fillers, urea, zinc oxide, sodium benzoate, calcium carbonate, atomite, talc, boron nitride, zinc stearate, calcium stearate, sodium benzoate, urea, zinc oxide, barium stearate, glycols, alkanolamines, oxidizing agents/peroxides, lead stearate, magnesium oxide, stearic acid, salicyclic acid, nano-composites and diphenylguanidine (DPG).

Typical prior art color concentrate compositions are prepared or mixed at elevated temperatures in processing equipment such as extruders or two-roll mills. Conventional process equipment cannot be utilized to prepare the compositions of the present invention as the blowing agents would be prematurely activated by the relatively high temperatures. Accordingly, the compositions of the present invention are processed at temperatures less than or equal to about generally 200° F. or 180° F., desirably 160° F., and preferably 140° F.

While the preferred process for blending and preferably pelletizing the compositions of the present invention is described hereinbelow, it is to be understood other processes known in the art and variations of the preferred process can also be utilized. The components of the composition including a pigment component containing desired pigments and at least one blowing agent in suitable amounts, minus any liquids and low temperature melting solids, are added to and mixed in a mixer, preferably a high intensity, bowl-type mixer known in the art and available from suppliers such as the Henschel Company of Germany. The mixer can be jacketed and connected to a temperature control system. The mixer has a rotary impeller that mixes as well as agitates the ingredients. The mixing action frictionally raises the temperature of the components. As the components are mixed, the pigment becomes ground, wetted, solvated and/or encapsulated by the other components, thereby providing excellent dispersion. When the temperature of the mixer reaches about 100° F., liquid components, if any, are added and the mixing is continued. At about 140° F. the low temperature melting solids, if any, are added to the composition and dispersed therein. The mixture is generally kept from exceeding the above stated temperatures. After a suitable period of mixing time the composition can be further processed immediately, or allowed to set at or below ambient temperature for any length of time. At this time, the composition can generally be described as granular or sand-like. The granular composition is subsequently cold compression molded into particles, preferably pellets. By cold, it is meant that no external heat source such as gas or electricity is utilized in the compression molding process. Thus, the composition is processed below the above stated ranges. One such compression molding device is a die and roller type pellet mill which is well known in the art and available from manufacturers such as CPM of San Francisco, Calif. as Model CL series processors. Die and roller pelletizing utilizes compaction and extrusion to produce pellets ranging in length from about 0.015 to about 1 inch, depending on the die utilized. The granular material from a supply hopper is fed continuously in a controlled stream to a pelletizing cavity. Rotation of a die in contact with the rollers cause the same to turn. The material carried by the rotation of the die is compressed between the die and the roll and forced through holes in the die. As pellets of the composition are extruded, a knife or other suitable cutting surface shears the pellets into lengths. Die sizes, and thus the pellets produced thereby may range from about 0.015 inches to about 0.250 inches in diameter with preferred sizes being about 0.625, 0.125, and 0.150 inches. Typically pellets are formed having a length about two or three times diameter.

The compositions of the present invention can be added to or melt blended with almost any known polymeric resin or material, both thermoplastic and thermosetting. Examples of thermoplastic polymeric material with which the compositions can be used include but are not limited to ABS resins prepared from acrylonitrile, butadiene and styrene; blends of ABS resins with other thermoplastics, such as, polyvinylchloride; diene resins; resins prepared from acrylonitrile, butadiene, styrene and alpha methyl styrene; resins prepared from butadiene, styrene and methacrylic acid; resins prepared from acrylonitrile, butadiene, styrene and methyl methacrylate acetal copolymers; acetal resins; acrylic resins and modified acrylic resins, such as, polymethyl methacrylate, copolymers of styrene and methyl methacrylate, copolymers of methyl methacrylate and alpha methyl styrene; the cellulosic plastics, such as, cellulose acetate plastics, cellulose acetate butyrate plastics, cellulose propionate plastics, ethyl cellulose plastics and cellulose nitrate plastics; mixtures of ethyl cellulose plastics and cellulose acetate butyrate; chlorinated polyether; the fluoroplastics such as, polytetrafluoroethylene, polyvinylidene fluoride, the fluorinate ethylene-propylene plastics and the chlorotrifluoroethylene plastics; the phenoxy resins; the polybutadiene-type resins, such as, butadiene-styrene copolymer and polybutadiene; the polycarbonates; polyolefins including polypropylene and polyethylene resins, such as, low-density polyethylene; copolymers of polyethylene with other materials; chlorinated polyethylenes; chlorosulfonated polyethylenes; ethylene vinyl acetate copolymer; ethylene acrylate copolymer; polyphenylene oxide; polypropylenes; the polysulfones; the polystyrenes; styrene copolymers, such as, styrene-methyl methacrylate copolymer; and vinyl polymers and copolymers, such as, polyvinyl chloride, copolymer of vinyl chloride and vinyl acetate, copolymer of vinyl chloride, vinyl acetate and vinyl alcohol, copolymer of vinyl chloride and vinylidene chloride, polyvinyldichloride, and combinations thereof.

Reinforced thermoplastics can be used. The reinforcing is normally done with glass fibers, metal fibers, refractory fibers, organic fibers such as from wood products and other fibers.

An important aspect of the present invention is that the concentrate compositions are universal in nature and are compatible or miscible with a wide range of polymeric resins. The color concentrate compositions are substantially free (contain less than 5, 3, 2, or 1 parts per 100 parts of the composition), and preferably free of any thermoplastic or thermosetting polymer resin or material. The compositions are also free of solvents, especially volatile organic solvent content (VOC), and silicates such as amorphous particulate silicates.

The color concentrate compositions of the present invention can be added to a polymeric material prior to or during processing or molding in amounts that range generally from about 0.5 parts to about 20 parts, desirably from about 1 parts to about 5 or 10 parts, and preferably from about 2 to about 3 or 4 parts by weight per 100 parts by weight of polymeric material. The color concentrate compositions of the present invention offer numerous advantages. Manufacturing costs are reduced as the color concentrate compositions of the present invention include components heretofore contained in separate compositions. Time and labor expenditures are reduced as only the color concentrate compositions of the present invention need to be added to a polymeric material or resin for molding instead of numerous compositions. Part weights can also be reduced inasmuch as the blowing agent has been incorporated therein. Furthermore, incorporation of the blowing agent allows lesser amounts of natural resin to be utilized to produce a part. Cycle times can also be reduced. The ability of the color concentrate compositions to include high loadings of pigments allow for reduced letdown ratios. Overall, a great amount of versatility is offered by the color concentrate compositions of the present invention. The compositions of the present invention can be utilized at temperatures generally from about 250° F. to about 600° F.

B) Purge Compositions

A further embodiment of the invention is a purge composition, and a method of use, that enables polymeric material or resin deposits to be removed from the inner surfaces of polymer processing equipment. The purge composition is in a concentrated form and is generally added at a desired ratio to a polymeric material or resin before or during addition to polymer processing machinery. The purge composition functions by scrubbing old resin deposits and other debris from the inner surfaces of the polymer processing machinery during a normal production cycle. Preferably, the purge composition is formulated to be most active over a temperature range that corresponds to the actual operating temperature range of the processing machinery. Numerous different formulations are described for the purge compositions. The compositions of the present invention advantageously can be utilized on machinery that is operating at low, standard, or high processing temperature ranges or anywhere therebetween.

The purging compositions of the present invention comprise various components including blowing agents, abrasives, binders, and surfactants. The compositions are preferably prepared utilizing a cold compression molding process, wherein the components such as the blowing agents are kept below temperature wherein the same would be activated or degraded.

Blowing or foaming agents are utilized in the purge compositions of the present invention. Blowing agents can be endothermic, exothermic, or a combination thereof. The specific blowing agent utilized is selected to be active at or below the processing temperature or range of the polymeric material being processed. Typical blowing agents, when activated, evolve or produce a gas such as nitrogen or carbon dioxide. As the gas evolves, the volume of the composition-polymeric material mixture expands within the processing device, resulting in the expansion of the mixture against the inner surfaces of the machinery causing an increase in the scrubbing action of the mixture which aids in the removal of the resin deposits. In order to prevent the blowing agent from prematurely activating or decomposing, the concentrate compositions are processed and preferably formed into particles such as pellets below the activation temperature of the blowing agent.

During molding of a polymeric material and a concentrate at elevated temperatures sufficient to degrade or activate the blowing agent, endothermic blowing agents will absorb heat as they degrade. The melt flow (polymer and composition) is placed under greater pressure by the blowing agent due to the evolution of gas. Accordingly, the pressure forces the mixture against the inner surfaces of the machinery wherein the other components of the composition, especially the abrasive component can beneficially act to cleanse the process equipment.

Blowing agents in general are utilized in the purge compositions of the present invention in amounts ranging from about 5 or about 10 to about 75 or 80 parts per 100 parts by weight of the composition, with about 25 to about 50 or about 60 parts being preferred. Endothermic blowing agents are utilized in the composition of the present invention in amounts which range generally from about 5 parts to about 50, about 60, or about 70 parts, desirably from about 25 parts to about 50 or about 55 parts, and exothermic blowing agents are utilized in amounts generally from about 5 parts to about 60 parts, and desirably from about 5 parts to about 30 or about 45 parts by weight based on 100 parts by weight of the composition.

An abrasive component is also utilized in the purge compositions of the present invention. The abrasive component advantageously has properties which can wear away by scraping, rubbing and/or grinding deposited polymeric material from the inner surfaces of the polymer processing equipment, such as an extruder barrel surface or injection screw, etc. The abrasive component generally works in a physical manner by scouring. Examples of suitable abrasive components include, but are not limited to, calcium carbonate, silica, alumina, sulfates, sulfides, talc, mica, or combinations thereof. The abrasive component can contain fine, medium, or course particles, or a distribution thereof to provide an effective abrasive action.

Examples of commercially available abrasives suitable for use in the abrasive component include, but are not limited to, Omyacarb® FT (calcium carbonate) available from Omya, Inc. and calcium carbonate available from Whittaker Clark and Daniels, talc (Talc 399) available from Whittaker, Clark and Daniels, clay (Burgess KE) available from Burgess Pigment Company, and barium sulfate (2278 Blanc Fixe) available from Whittaker, Clark and Daniels.

The abrasive component is utilized in the purge compositions of the present invention in amounts generally from about 5 or about 10 parts to about 75 parts, desirably from about 20 parts to about 70 parts, and preferably from about 25 parts to about 50 parts, based on 100 parts by weight of said composition.

The abrasive compositions of the present invention also include a surfactant component. Surfactants are generally used in the formula to de-dust and/or densify. Examples of surfactants include, but are not limited to mineral oil, castor oil, and soybean oil. The preferred surfactant is mineral oil, such as Drakeol 34 available from Pennreco. Maxsperse W-6000 and W-3000 solid surfactants are available from Chemax Polymer Additives. The surfactants can be in either solid or liquid form.

The surfactant component is utilized in the purge compositions of the present invention in amounts generally from about 1 to about 30 parts, desirably from about 2 or about 5 to about 25 parts, and preferably from about 4 to about 8 parts, based on 100 parts by weight of said composition.

A binder component is also utilized in the purge compositions of the present invention and is also described hereinabove. The binder can beneficially "wet" the other components present and render them more dispersible in the polymeric material added with the composition to purge the processing machinery. The binder components are waxes which can be natural or synthetic. The waxes are generally solid at room temperature and have a molecular weight of less than about 10,000 weight average. The binder component is present in the purge compositions of the invention in amounts greater than about 10% by weight, and generally from about 10 parts to about 50 parts, and preferably from about 10 parts to about 25 parts per 100 parts by weight of the composition.

The purge compositions of the present invention can optionally include at least one functional compounding additive component including, but not limited to, nucleators, activators which lower the activation temperature of the blowing agent, plasticizers, fillers, mold release aids, processing aids, antistatic additives, and lubricants as described hereinabove. The optional components including one or any combination of the above listed components are present in the purge compositions in an amount generally from about 0 or 1 part to about 98 parts, desirably from about 25 parts to about 50 parts, and preferably from about 10 parts to about 20 parts by weight based on 100 parts of the total composition.

The purge compositions of the present invention can be used in generally any polymer processing equipment known to the art which operate at temperatures generally from about 200° F. and above, and preferably from about 250° F. to about 600 or about 700° F. The components of the purge composition are chosen to be effective at and compatible with the predetermined processing temperature.

In a first embodiment, the purge composition is optimized for purging deposits from the polymer processing equipment that is operating at low processing temperatures, such as about 400° F. or less. This first purge composition includes an endothermic blowing agent (also known as a foaming agent), an abrasive, a low melt temperature binder, and a surfactant. The formulation for this embodiment is shown in Table 1.

TABLE 1

LOW TEMPERATURE PURGE COMPOSITION FORMULATION

| Purge Agent | Quantity in Formula (%) |
|---|---|
| MSO1 Cenblo Mat 500 or equivalent endothermic blowing agent (e.g., coated sodium bicarbonate and citric acid) | 50 |
| Omyacarb ® FT or equivalent small particle calcium carbonate | 33 |
| Mineral Oil or equivalent surfactant | 2 |
| Cerit 220 powder or equivalent hydroxy stearamide wax | 15 |
| Total | 100% |

The preferred blowing agent in the first embodiment is the commercial product MSO1 Cenblo Mat 500 available from Mats Corp. Ltd. (Markham, Ontario, L3R Canada). MSO1 Cenblo Mat 500 is a carboxylic acid and carbonate based product. However, the formulation could include any other endothermic blowing agent which results in a purge composition which may be used to purge resin deposits as desired. Alternatively, a blowing agent could be prepared as a mixture of generic ingredients, such as a mixture of generic coated sodium bicarbonate and citric acid, or the like.

The abrasive in the first embodiment adds to the scrubbing action of the purge composition and also acts as a filler. The commercial product Omyacarb® FT available from Omya Inc. (Florence, Vt.) is the preferred abrasive in the first embodiment. Omyacarb® FT is a calcium carbonate based product. However, the formulation could include any other abrasive that would increase the scrubbing action of the purge composition for the removal of resin deposits. For example, another small particle calcium carbonate having an average particle size of not greater than about 1.5 microns can be substituted for the Omyacarb® FT. Preferably, the average particle size should be about 1.3 microns, as in the Omyacarb® FT product.

The preferred binder in the first embodiment is the commercial product Cerit 220 Powder available from E. W. Kaufman (Southamper, Pa.). Cerit 220 is a hydroxystearamide based product. A hydroxystearamide wax, or any other suitable alternative, can be substituted for the Cerit 220. Whichever binder is used, it should preferably be a low melt temperature binder which will release at approximately 220° F. The melted binder aids the incorporation of the purge composition into the melt flow of the resin. The surfactant in the first embodiment is mineral oil. However, any suitable surfactant having the ability to coat or wet out the inner surfaces of the polymer processing machinery can be substituted.

In a second embodiment, the purge composition has a more effective scrubbing action at standard processing temperatures, such as within the range of about 400° F.–500° F., whereas in the first embodiment the first composition exhibits a more effective scrubbing action at lower processing temperatures. The formulation of the second purge composition includes the same abrasives and surfactants as those included in the formulation of the first purge composition. However, the second formulation differs from the first in that the endothermic blowing agent and the binder are more appropriate for use at standard processing temperatures. The formulation for this embodiment is shown in Table 2.

TABLE 2

STANDARD TEMPERATURE PURGE COMPOSITION FORMULATION

| Purge Agent | Quantity in Formula (%) |
|---|---|
| MSO1 Cenblo Mat 100 or equivalent endothermic blowing agent (e.g., coated sodium bicarbonate and citric acid) | 50 |
| Omyacarb ® FT or equivalent small particle calcium carbonate | 33 |
| Mineral Oil or equivalent surfactant | 2 |
| Advawax ® 280 or equivalent ethylene bis stearamide wax | 15 |
| Total | 100% |

The preferred blowing agent in the second embodiment is the commercial product MSO1 Cenblo Mat 100 available from Mats Corp. Ltd. (Markham, Ontario, L3R Canada). MSO1 Cenblo Mat 100 is a carboxylic acid and carbonate based product. However, any other endothermic blowing agent could be included in the composition as long as it results in a purge formulation capable of being used to purge resin deposits as desired. For example, a blowing agent could be prepared as a mixture of generic ingredients, such as a mixture of coated sodium bicarbonate and citric acid or the like, at a ratio effective for standard processing temperatures.

The preferred binder in the standard temperature purge composition is the commercial product Advawax® 280 available from Rohm & Haas Co. (Cincinnati, Ohio). Advawax® 280 is an N,N ethylene bis(stearamide) based product. However, an ethylene bis stearamide wax, or any other suitable alternative, can be substituted. The binder should be a low melt temperature binder which will release at approximately 280° F., thereby aiding the incorporation of the purge composition into the melt flow of the stream of resin.

The ratio of endothermic blowing agent to abrasive in both the first and second purge composition formulations is optimized to achieve a maximum scrubbing action. This optimized ratio is preferably within the range from about 1.5:1 to about 2:1.

In a third embodiment, the purge composition has a more effective scrubbing action at high processing temperatures, such as about 500° F. or higher, whereas the first and second purge compositions are more effective at low and standard processing temperatures, respectively. The third composition uses the same abrasives and surfactants as those listed for the first and second compositions. However, the third composition differs from both of the previous compositions in that it preferably uses an exothermic blowing agent and a binder than are appropriate for use at high processing temperatures. The formulation for this embodiment is shown in Table 3.

TABLE 3

HIGH TEMPERATURE PURGE COMPOSITION FORMULATION

| Purge Agent | Quantity in Formula (%) |
|---|---|
| Expandex ® 5PT or equivalent exothermic blowing agent (5-Phenyl tetrazole based chemistry) | 40 |
| Omyacarb ® FT or equivalent small particle calcium carbonate | 43 |
| Mineral Oil or equivalent surfactant | 2 |
| Advawax ® 280 or equivalent ethylene bis stearamide wax | 15 |
| Total | 100% |

The preferred blowing agent in the third embodiment is the commercial product Expandex® 5PT available from Uniroyal Chemical Company, Inc. (Middlebury, Conn.). Expandex®5PT is a 5-phenyl tetrazole based product. However, the composition could include any other exothermic blowing agent which results in a purge composition which may be used to purge resin deposits as desired. The action of the exothermic blowing agent will preferably be based on 5-Phenyltetrazole chemistry. Alternatively, other high temperature formulations might use an endothermic blowing agent, such as Mat 201 or Mat 101 (Mats Corp. Ltd., Markham, Ontario, L3R Canada), as long as the endothermic blowing agent results in a desired level of resin deposit removal at these high temperatures. Mat 201 and Mat 101 are chemical blends of polycarbonic acids, inorganic carbonates, and stearates.

In its most preferred embodiment, the formulation for the third purge composition has an optimal ratio of exothermic blowing agent to abrasive that results in maximum scrubbing action at high temperatures. This ratio is most preferably about 1:1. The average particle size of the abrasive is the same as that noted for use in the previous formulations.

The preferred binder of the high temperature purge composition is the commercially available product Advawax® 280 (Rohm & Haas Co., Cincinnati, Ohio). Advawax® 280 is an N,N ethylene bis(stearamide) based product. However, an ethylene bis stearamide wax, or any other suitable alternative, can be substituted. The binder should be a low melt temperature binder which will release at approximately 280° F.

A further example of a purge composition suitable at least for high temperature processing range is set forth in Table 4 below. An endothermic blowing agent is utilized in this formulation.

TABLE 4

HIGH TEMPERATURE PURGE COMPOSITION FORMULATION

| | |
|---|---|
| Matendo P80 (exothermic blowing agent) | 50 |
| Omyacarb ® 4 (calcium carbonate) | 19 |
| Drakeol 34 (mineral oil) | 25 |
| Advawax ® 280 (ethylene bis stearamide wax) | 6 |
| Total | 100% |

The present invention further provides a method for purging resin deposits from the processing or inner surfaces of polymer processing machinery. The method includes feeding a mixture comprised of a foaming agent, an abrasive, a surfactant, and a binder into the stream of resin in the polymer processing equipment. The mixture is poured from a container directly into a hopper of the polymer processing equipment and is added directly to the stream of resin moving through the barrel of the processing equipment. As the die and other tooling surfaces are thus cleaned in accordance with the invention, the resulting molded articles may have undesirable ingredients attributable to the purge composition. Some of these articles may be recycled in the same or a compatible stream of resin.

As the purge concentrate mixes with the stream of resin, the mixture is heated as it moves along the barrel of the machinery. The binder that holds the components of the purge composition together then melts into the stream of resin, thereby releasing the individual components of the composition into the stream of resin. Incorporation of the purge composition into the melt flow is additionally aided by the presence of the melted binder.

The blowing agent begins to degrade when it reaches the appropriate elevated temperature within the processing machinery. This degradation results in the production of gas bubbles within the melt flow. As the quantity of gas increases within the resin/purge composition mixture, the volume of the mixture expands. The subsequent increase in pressure which results from the expansion of the mixture against the inner surfaces of the machinery causes an increase in the scrubbing action of the mixture which aids in the removal of resin deposits.

The abrasive component of the purge composition is released along with the blowing agent as the binder melts into the stream of resin. Additional scrubbing action is added by the abrasive to the resin mixture, and the abrasive additionally functions as sites of nucleation for the newly forming gas bubbles produced by the degradation of the blowing agent. The small size of the abrasive particles, i. e., less than 1.5 microns, increases the number of potential nucleation sites which results in a more even distribution of the gas bubbles within the melt flow. An even dispersion of the gas within the stream of resin helps to improve the scrubbing action of the purge concentrate along the inner surfaces of the processing machinery. The processing machinery containing the purge composition is operated until the molded composition exiting the machine appears clean, thereby indicating that the internal parts of the machine are clean.

As mentioned above, the normal ratio of endothermic blowing agent to filler is preferably within the range from about 1.5:1 to about 2:1. This same ratio is used for both the low and standard temperature purge compositions. However, the ratio of exothermic blowing agent to filler used in the high temperature purge composition is preferably about 1:1. These ratios are chosen based upon the amount of gas produced by the particular blowing agent employed. More specifically, the exothermic chemistry involved in the degradation of the exothermic blowing agent typically generates 3 to 5 times the amount of gas produced by the endothermic chemistry associated with the degradation of the endothermic blowing agent. Therefore, due to the greater amount of gas generated by the exothermic agent, less blowing agent is required to achieve sufficient gas production.

Typical prior art compositions are prepared or mixed at elevated temperatures in processing equipment such as extruders or two-roll mills. Conventional process equipment cannot be utilized to prepare the compositions of the present invention as the blowing agents would be prematurely activated by the relatively high temperatures. Accordingly, the purge compositions of the present invention are processed at temperatures less than or equal to about generally 200° F. or about 180° F., desirably less than or equal to about 160 F. and preferably less than or equal to about 140° F. The purge compositions are preferably prepared utilizing cold compression molding as described hereinabove.

The compositions of the present invention can be added to or melt blended with almost any known polymer, resin, or material, both thermoplastic and thermosetting as also described hereinabove.

An important aspect of the present invention is that the purge compositions are universal in nature and are compatible or miscible with a wide range of the above polymeric resins.

In accordance with another feature of the invention, the performance of the purge composition may be affected by the ratio of purge concentrate to resin. The purge concentrate is added to a stream of polymer, resin, etc. in an amount generally from about 1 to about 25, 50 or 100 parts, desirably from about 2 to about 20 parts, and preferably from about 3 or 4 to about 10 or 15 parts per 100 parts of resin prior to or during the purging operation. Higher amounts of purge concentrate are generally utilized when a greater level of scrubbing is required for sufficient cleaning of the machinery.

The foregoing invention will be better understood by reference of the following examples which serve to illustrate, but not to limit the present invention.

EXAMPLES

The following examples illustrate the advantages of the color concentrate compositions of the present invention. 4"×6"×0.125" plaques were molded on a 120-Ton Van Dorn injection molding machine having a general purpose screw and 28 ounce barrel capacity. In each experiment 10 plaques were molded for each set of data and the collected data was averaged therefrom.

Example 1

The first example utilized Basell SD-242 Polypropylene resin. The injection molding temperature settings were as follows: Nozzle 440° F., Front Zone 440° F., Center Zone 440° F., and Rear Zone 440° F. Both the control composition and the present invention composition were utilized in an amount of 2 parts per 100 parts by weight of the polypropylene resin. The compositions contained the following components.

| Composition | Control | Present Invention |
| --- | --- | --- |
| Pigment (carbon black) (parts) | 40 | 40 |
| Binder (60% ethylene bis-stearamide wax and 40% hydroxystearamide wax) (parts) | 60 | 35 |
| Blowing Agent (endothermic) (Cenblo Mat 100) (parts) | — | 25 |
| Total (parts) | 100 | 100 |

| Results | Control | Present Invention | Reduction % vs. Control |
| --- | --- | --- | --- |
| Part weight (grams) | 465.69 | 427.12 | 8.28% |
| Mold Closed Time (seconds) | 35.00 | 22.00 | 37.14% |
| Peak Injection Pressure (psi) | 444.96 | 398.29 | 10.49% |
| Shot size (inches) | 2.30 | 2.10 | 8.70% |
| Cycle time (seconds) | 48.49 | 33.81 | 30.37% |

As can be seen from the above chart, the compositions of the present invention including a blowing agent result in dramatic improvements in the measured properties. Less resin is utilized and the part weight can be decreased, offering a cost savings when compared to the control color composition. Furthermore, the mold closed time and cycle times were reduced allowing part throughput to be increased, thus providing labor or time savings to the molder.

Example 2

The second example utilized Dow 128 Polyethylene. The injection molding temperature settings were as follows: Nozzle 400° F., Front Zone 400° F., Center Zone 400° F., and Rear Zone 400° F. Both the control composition and the present invention composition were utilized in an amount of 2 parts per 100 parts by weight of the polyethylene resin. The compositions contained the following components.

| Composition | Control | Present Invention |
| --- | --- | --- |
| Pigment (carbon black) (parts) | 40 | 40 |
| Binder (60% ethylene bis-stearamide wax and 40% hydroxystearamide wax) (parts) | 60 | 35 |
| Blowing Agent (endothermic) (Cenblo Mat 500) (parts) | — | 25 |
| Total (parts) | 100 | 100 |

-continued

| Results | Control | Present Invention | Reduction % vs. Control |
|---|---|---|---|
| Part weight (grams) | 474.23 | 440.08 | 7.16% |
| Mold Closed Time (seconds) | 35.00 | 15.00 | 57.14% |
| Peak Injection Pressure (psi) | 503.38 | 461.98 | 7.03% |
| Shot size (inches) | 2.32 | 2.10 | 9.48% |
| Cycle time (seconds) | 49.28 | 31.09 | 36.91% |

As can be seen from the above chart, the compositions of the present invention including a blowing agent result in dramatic improvements in the measured properties. Less resin is utilized and the part weight can be decreased, offering a cost savings when compared to the control color composition. Furthermore, the mold closed time and cycle times were reduced allowing part throughput to be increased, thus providing labor or time savings to the molder.

Example 3

The third example utilized GE MC 8002 Polycarbonate. The injection molding temperature settings were as follows: Nozzle 520° F., Front Zone 520° F., Center Zone 520° F., and Rear Zone 520° F. Both the control composition and the present invention composition were utilized in an amount of 2 parts per 100 parts by weight of the polycarbonate resin. The compositions contained the following components.

| Composition | Control | Present Invention |
|---|---|---|
| Pigment (carbon black) (parts) | 40 | 40 |
| Binder (60% ethylene bis-stearamide wax and 40% hydroxystearamide wax) (parts) | 60 | 35 |
| Blowing Agent (exothermic) (Expandex 5PT) (parts) | — | 25 |
| Total (parts) | 100 | 100 |

| Results | Control | Present Invention | Reduction % vs. Control |
|---|---|---|---|
| Part weight (grams) | 459.84 | 425.10 | 7.55% |
| Mold Closed Time (seconds) | 28.50 | 17.50 | 38.60% |
| Peak Injection Pressure (psi) | 1154 | 1115.00 | 3.38% |
| Shot size (inches) | 2.35 | 2.28 | 3.00% |
| Cycle time (seconds) | 49.85 | 32.43 | 34.94% |

As can be seen from the above charts, the compositions of the present invention including a blowing agent result in dramatic improvements in the measured properties. Less resin is utilized and the part weight can be decreased, offering a cost savings when compared to the control color composition. Furthermore, the mold closed time and cycle times were reduced allowing part throughput to be increased, thus providing labor or time savings to the molder.

While in accordance with the patent statutes the best mode and preferred embodiment have been set forth, the scope of the invention is not limited thereto, but rather by the scope of the attached claims.

What is claimed is:

1. A color concentrate composition for polymeric materials comprising:
   at least one pigment in an amount from about 1 part to about 75 ports per 100 total parts by weight of said composition;
   at least one blowing agent in an amount from about 1 part to about 75 parts per 100 total parts by weight of said composition;
   a wax binder component in an amount greater than about 10 parts per 100 total parts by weight of said composition;
   and optionally, at least one functional additive component in an amount from 0 to about 98 parts per 100 total parts by weight of said composition, said composition being substantially free of a polymeric resin material, said composition having been processed at a temperature below an activation temperature of the at least one blowing agent in order to prevent premature degradation, and said composition being in a solid particulate form.

2. A color concentrate composition according to claim 1, wherein said at least one pigment is an inorganic pigment, organic pigment, or a combination thereof.

3. A color concentrate composition according to claim 1, wherein said at least one blowing agent is an endothermic blowing agent, an exothermic blowing agent, or a combination thereof.

4. A color concentrate composition according to claim 3, wherein said composition includes said at least one functional additive component.

5. A color concentrate composition according to claim 4, wherein said functional additive component is present in an amount from about 1 to about 70 parts per 100 parts by weight of said composition.

6. A color concentrate composition according to claim 4, wherein said composition is in the form of a pellet.

7. A color concentrate composition according to claim 6, wherein said composition has been processed at a temperature of less than about 200° F.

8. A color concentrate composition according to claim 7, wherein said at least one functional additive component comprises calcium carbonate.

9. A color concentrate composition according to claim 1, wherein said binder component comprises a wax having a molecular weight of less than 10,000.

10. A color concentrate composition according to claim 9, wherein said wax is an ethylene bis-stearamide wax, a hydroxystearamide wax, or a combination thereof.

11. A color concentrate composition according to claim 9, wherein said wax is an ethylene bis-stearamide wax, a hydroxystearamide wax, a polycaprolactam wax, a polyolefin wax, or a combination thereof.

12. A color concentrate composition according to claim 9, wherein said wax is present in an amount from about 10 to about 40 parts per 100 parts by weight of the total composition.

13. A method for preparing a color concentrate composition for use in polymeric materials, comprising the steps of:
   compounding said color concentrate composition comprising at least one pigment, at least one blowing agent, a wax binder component and optionally a functional additive;

mixing said composition at a temperature below about 180° F.; and cold compression molding said composition into a particulate form.

14. A method for preparing a color concentrate composition according to claim 13, wherein said cold compression molding step is conducted at a temperature below the activation temperature of said at least one blowing agent.

15. A method for preparing a color concentrate composition according to claim 14, wherein said functional additive component is present in an amount from about 1 to about 98 parts per 100 parts by weight of said composition.

16. A method for preparing a color concentrate composition according to claim 15, wherein said pigment is present in said composition in an amount from about 1 part to about 75 parts and said blowing agent is present in said composition in an amount from about 1 part to about 75 parts per 100 parts by weight of said composition.

17. A method for preparing a color concentrate composition according to claim 13, wherein said blowing agent is an endothermic blowing agent, or an exothermic blowing agent, or a combination thereof.

18. A method for preparing a color concentrate composition according to claim 13, wherein said functional additive component is present in an amount from about 1 to about 50 parts per 100 parts by weight of said composition.

19. A method for preparing a color concentrate composition according to claim 13, wherein said binder component comprises a wax having a molecular weight of less than about 10,000.

20. A method for preparing a color concentrate composition according to claim 19, wherein said wax is an ethylene bis-stearamide wax, a hydroxystearamide wax, or a combination thereof.

21. A method for preparing a color concentrate composition according to claim 19, wherein said wax is an ethylene bis-stearamide wax, a hydroxystearamide wax, a polycaprolactam wax, a polyolefin wax, or a combination thereof.

22. A method for preparing a color concentrate composition according to claim 19, wherein said wax is present in an amount from about 10 to about 40 parts per 100 parts by weight of the total composition.

23. A method for preparing a color concentrate composition according to claim 13, wherein said particulate form is a pellet, a chip, or a flake.

24. A method for preparing a color concentrate composition according to claim 23, wherein said particulate is a pellet.

* * * * *